(12) United States Patent
Syukri

(10) Patent No.: US 6,542,747 B1
(45) Date of Patent: Apr. 1, 2003

(54) RADIO COMMUNICATION SYSTEM

(75) Inventor: Agus Fanar Syukri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/501,772

(22) Filed: Feb. 10, 2000

(30) Foreign Application Priority Data

Feb. 15, 1999 (JP) .......................................... 11-036446

(51) Int. Cl.$^7$ ................................................ H04Q 7/20
(52) U.S. Cl. ...................... 455/450; 455/452; 455/453; 455/62; 370/422; 370/441; 370/450
(58) Field of Search ................................ 455/450, 452, 455/453, 62; 370/422, 441, 450, 328

(56) References Cited

U.S. PATENT DOCUMENTS

| | | | | | |
|---|---|---|---|---|---|
| 6,119,011 | A | * | 9/2000 | Borst .......................... | 455/452 |
| 6,138,034 | A | * | 10/2000 | Willey ........................ | 455/422 |
| 6,178,326 | B1 | * | 1/2001 | Kalliokulju ................. | 455/436 |
| 6,192,252 | B1 | * | 2/2001 | Lysejko ....................... | 455/512 |
| 6,215,990 | B1 | * | 4/2001 | Kidd ............................ | 331/176 |
| 6,230,016 | B1 | * | 5/2001 | Benveniste ................. | 455/450 |
| 6,259,917 | B1 | * | 7/2001 | Elzein ......................... | 455/435 |
| 6,259,922 | B1 | * | 7/2001 | Benveniste ................. | 455/452 |
| 6,289,202 | B1 | * | 9/2001 | Kikuchi ....................... | 455/62 |
| 6,301,233 | B1 | * | 10/2001 | Ku .............................. | 370/329 |
| 6,343,070 | B1 | * | 1/2002 | Klas et al. ................... | 370/329 |
| 2001/0049282 | A1 | * | 12/2001 | Ushiki et al. ............... | 455/422 |

FOREIGN PATENT DOCUMENTS

| | | |
|---|---|---|
| JP | 58-191542 | 11/1983 |
| JP | 4-286432 | 10/1992 |
| JP | 8-70479 | 3/1996 |
| JP | 4-213234 | 8/1998 |

* cited by examiner

Primary Examiner—Lester G. Kincaid
Assistant Examiner—Khawar Iqbal
(74) Attorney, Agent, or Firm—Foley & Lardner

(57) ABSTRACT

When a communication is established between a mobile unit 1 and a base station 2B, the base station 2B requests a management server 4 of an update of an idle channel information thereof through a cable network 3. The management server 4 updates the idle channel information of the requesting base station and transmits an idle channel information of base stations 2A and 2C peripherally of the base station 2B to the mobile unit 1 through the cable network 3 and the base station 2B. When the mobile unit 1 is moved from a cell of the base station 2B to a cell of one of the base stations 2A and 2C, the mobile unit 1 selects an idle channel from the idle channel information of the peripheral base stations provided by the management server 4 and uses a frequency of the selected idle channel as a frequency of the mobile unit.

9 Claims, 9 Drawing Sheets base station information memory table of management server 4

| base station ID : idle channel | base station ID : peripheral base station ID |
|---|---|
| base station 2A : channel 11 | base station 2A : base station 2B |
| channel 12 | |
| channel 13 | base station 2B : base station 2A |
| | : base station 2C |
| base station 2B : channel 21 | |
| channel 22 | base station 2C : base station 2B |
| | : base station 2D |
| base station 2C : channel 31 | |
| channel 32 | base station 2D : base station 2C |
| | · · · · |
| base station 2D : channel 41 | |
| · · · · : · · · · | base station 2n : · · · · |

FIG.6 peripheral base station information table of base station 2B idle channel channel 11 channel 12 channel 13 channel 31 channel 32

FIG.7 base station : sequence table

8A : 1~10, 20, 30, 19, 29, . . . . , 11, 21

8B : 11~20, 30, 10, 29, 9, . . . . , 21, 1

8C : 21~30, 10, 20, 9, 19, . . . . , 1, 11

Prior Art

FIG.9

RADIO COMMUNICATION SYSTEM

CROSS REFERENCE TO RELATED APPLICATIONS

The present invention claims priority from Japanese Patent Application No. 11-036446 filed Feb. 15, 1999, the contents of which are incorporated herein by reference.

BACKGROUND OF THE INVENTION

1. Field of the Invention

The present invention relates to a radio communication system in which a service area is composed of a plurality of cells, a base station is provided in each of the service cells and a plurality of channels are assigned to each base station for performing communication between a plurality of mobile units and these base stations.

2. Description of the Related Art

In a mobile radio communication system, it is possible to increase the number of mobile units (users) by effectively utilizing a limited number of communication channels. Therefore, it is important to utilize the channels effectively. Besides the conventional fixed channel assignment method in which communication channels, which can be used always, are preliminarily assigned to every base station, a method for searching a communication channel usable on demand and using it has been proposed as a method for effectively utilizing communication channels. The latter method is referred to as "dynamic channel assignment method for adaptively re-utilizing channels".

As a concrete example of the dynamic channel assignment method, Japanese Patent Application Laid-open No. H6-53901 discloses a technique titled "Idle Channel Detection Method for Mobile Communication" in which interference wave levels of all of communication channels assigned to a system are measured in an arbitrary sequence and communication channels whose interference wave levels are lower than a certain constant level are determined as idle channels, which are in idle state and can be utilized.

In the disclosed conventional idle channel detection method for mobile communication system, which is constructed with a service area composed of a plurality of cells, base stations provided in the respective cells, a plurality of mobile units and a plurality of communication channels assigned to the system for performing communication between the mobile units and the base stations, the mobile unit or the base station measures interference wave levels in all of communication channels assigned to the system in an arbitrary sequence and communication channels whose interference wave levels are lower than a certain constant level are determined as idle channels. The communication is performed between the mobile units and the base stations by utilizing the idle channels.

In the conventional method, a plurality of different idle channel search sequence tables of the communication channels having interference wave levels to be measured are prepared and each of the idle channel search sequence table is assigned to base stations separated from each other by a constant distance. The base station or the mobile unit measures the interference wave levels of the communication channels in sequence according to the assigned idle channel search sequence table. In a case where the mobile unit measures the interference wave levels, the base station notifies the mobile unit of the assigned sequence table such that the base station or the mobile unit can use an idle channel, which is initially detected by the mobile unit according to the idle channel search sequence table supplied from the base station, for the communication therebetween.

An operation of the idle channel detection method of the conventional mobile communication system will be described with reference to FIGS. 8 and 9, in which a mobile unit 1 communicates with one of base stations 8A, 8B and 8C, which are connected to a management server (not shown) through a cable network (not shown), while moving from a cell having one base station to another cell having another base station.

In FIG. 8, it is assumed that the mobile unit 1 communicates with the base station 8A provided in a service cell 8a. It should be noted that each of base stations denoted by 8A, 8B and 8C can use the same communication channels repeatedly. FIG. 9 shows an idle channel search sequence table, which is provided in each of the base stations and indicates sequences of the communication channels whose interference wave levels are to be measured to find an idle channel in each base station. As shown in FIG. 9, communication channels 1 to 10, 20, 30, 19, 29, ..., 11, 21 are searched in the sequence for idle channel in the base station 8A, communication channels 11 to 20, 30, 10, 29, 9, ..., 21, 1 are searched in the sequence for idle channel in the base station 8B and communication channels 21 to 30, 10, 20, 9, 19, ..., 1, 11 are searched in the sequence for idle channel in the base station 8C.

A case where an amount of traffic is small and the number of channels used in each base station is smaller than 10 will be considered. For example, if the mobile unit 1 searches an idle channel when the base station 8A is using channels 1 to 5, the base station 8A requests the management server the idle channel search sequence table first. Then, the base station 8A searches the communication channels from channel 1 according to the idle channel search sequence table and repeats the search until the idle channel is found. In such case, the channel 6 may be detected as an idle channel detection.

That is, since the respective base stations detect idle channels according to the idle channel search sequence table, it is probable that channels used in the base station 8A become busy from the initial channel 1, channels used in the base station 8B become busy from the initial channel 11 and channels used in the base station 8C become busy from the initial channel 21. Therefore, if the traffic is small, the possibility that all of the channels 1 to 10 are used in both the base stations 8B and 8C may be low and the possibility that the channel 6 is an idle channel may be high.

If the amount of traffic is large and the channels 1 to 10 are being used in the base station 8A, there is no idle channel in the base station 8A since the limit capacity of the system is 10 channels. However, the possibility that there is an idle channel or channels if there is a base station which is using channels the number of which is smaller than 10. When the mobile station 1 performs the idle channel detection, the mobile unit 1 requests the idle channel search sequence table from the base station 8A, first. Then, the mobile unit 1 measures the idle channel from the channel 1 according to the idle channel search sequence table and repeats the measuring processing until an idle channel is detected.

Since the base station 8B uses channels from the channel 11, the possibility that the channel 20 among the channels 11 to 20 is not used is the largest. Similarly, in the base station 8C, the possibility that the channel 30 is idle is high. Therefore, if the mobile unit 1 performs the measurement in a sequence of channels 20, 30, 19, 29, ... according to the idle channel search sequence table supplied from the base station, it is possible to detect an idle channel with minimum number of measurements.

However, there are the following problems in the described prior art. That is, since, in order to detect an idle channel in the mobile unit, interference wave levels must be measured (detected) from the initial channel according to the idle channel search sequence table until an idle channel is detected, it takes a long time to detect an idle channel when the amount of traffic is large.

Further, since the idle channel search sequence tables assigned to the respective base stations are fixed, the idle channel detection in the mobile unit must be performed from initial channels of the respective base channels according to the idle channel search sequence tables without taking channels, which are being used, into consideration.

SUMMARY OF THE INVENTION

An object of the present invention is to provide a mobile unit radio communication system, in which a scanning of idle channels in base stations located around a mobile unit can be performed efficiently in the mobile unit to thereby improve the search speed.

In the present invention, when a communication link between a mobile unit and a base station is established, the base station itself requests a management server an update of its own idle channel information through a cable network. Upon the request, the management server updates the idle channel information of the base station and transmits an idle channel information of peripheral base stations located peripherally of the base station to the mobile unit through the cable network and the base station, which requested the update of own idle channel information.

The mobile unit searches channel frequencies, which are not used by other base stations, by searching idle channels of the peripheral base stations, selects an idle channel from the idle channel information of the peripheral base stations, which is given by the management server, and uses the idle channel frequency thus selected as the frequency of the mobile unit, without searching idle channel of the peripheral base stations.

Therefore, there is no need for the mobile unit of searching idle channel of the peripheral base stations and it is enough to select an idle channel from the idle channel search sequence table storing the idle channel information of the peripheral base stations. Consequently, it becomes possible to realize a mobile radio communication system having an efficient idle channel detector.

BRIEF DESCRIPTION OF THE DRAWINGS

A specific embodiment of the present invention will now be described, by way of example only, with reference to the accompanying of drawings in which:

FIG. 6 shows an example of a content of a base station information memory table provided in the management server shown in FIG. 4;

FIG. 7 shows an example of a content of a peripheral base station information memory table provided in the base station shown in FIG. 2;

FIG. 9 is a table explaining an operation of the prior art mobile radio communication system shown in FIG. 8.

DETAILED DESCRIPTION OF THE PREFERRED EMBODIMENTS

Figure 1:
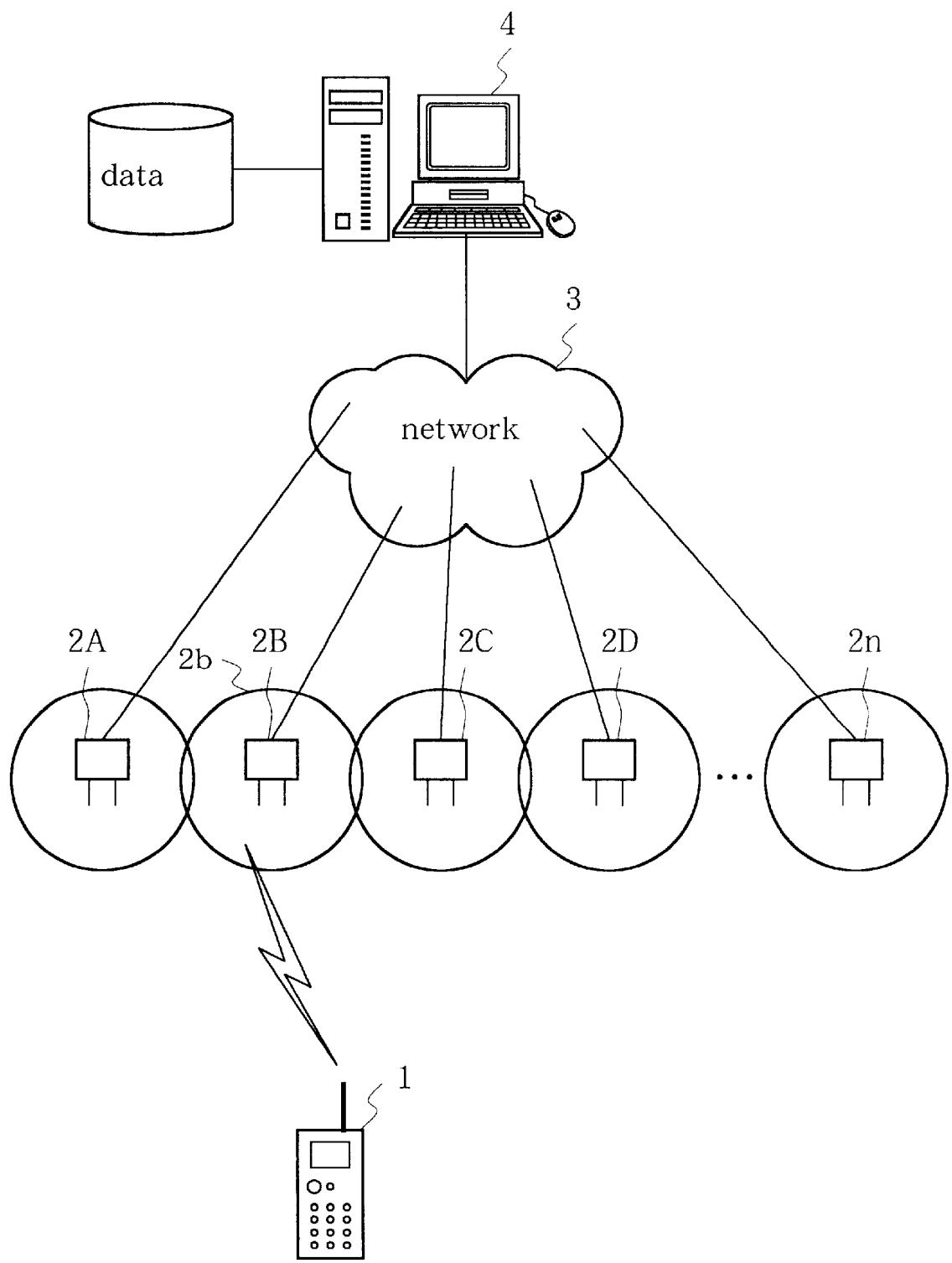
FIG. 1 shows a whole construction of a mobile radio communication system according to an embodiment of the present invention.

FIG. 1 shows a whole construction of a radio communication system according to an embodiment of the present invention. The radio communication system shown in FIG. 1 is constructed with a mobile unit 1 capable of communicating with a base station through an electromagnetic wave while moving between base stations, base stations 2A, 2B, 2C, . . . , 2n capable of communicating with the mobile unit 1 through electromagnetic wave and managing idle channels thereof, a cable network 3 for connecting the base stations 2A, 2B, 2C, . . . , 2n to a management server 4 and the management server 4 for managing an idle channel information of all of the respective base stations and ID's of peripheral base stations located peripherally of each base station.

The respective base stations 2A, 2B, 2C, . . . , 2n are arranged in a predetermined distance interval and have identical constructions. In this embodiment, it is assumed that a communication link is established between the mobile unit 1 and the base station 2B in a cell 2b and the mobile unit 1 is still searching another base station to be next communicated with.

Figure 2:
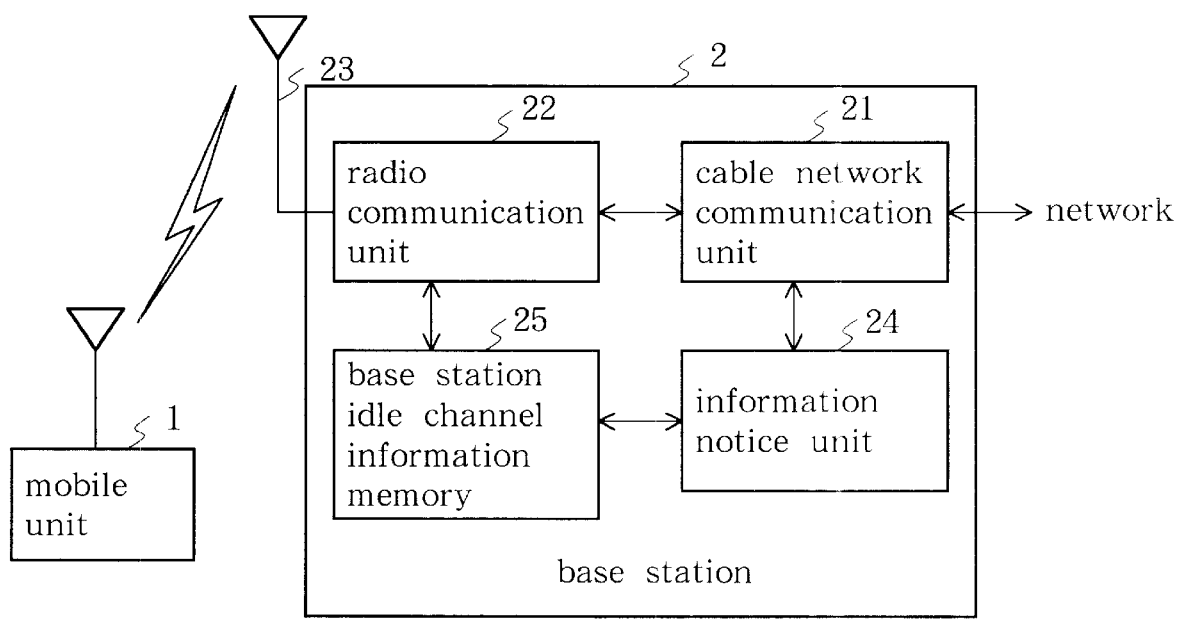
FIG. 2 shows a construction of a base station of the mobile radio communication system of the present invention.

FIG. 2 shows a construction of a base station 2 according to the present invention. The base station 2 includes a cable network communication unit 21, a radio communication unit 22, an antenna 23 for communicating with the mobile unit through an electromagnetic wave having a predetermined frequency, an information notice unit 24 and an idle channel information memory 25 for storing an idle channel information of the base station 2. The cable network communication unit 21 is connected to the management server 4 through a cable network 3. The radio communication unit 22 processes a RF signal in the base station 2 connected to the mobile unit 1 through the RF signal. The information notice unit 24 transmits an idle channel information of the base station 2 to the management server 4.

Figure 3:
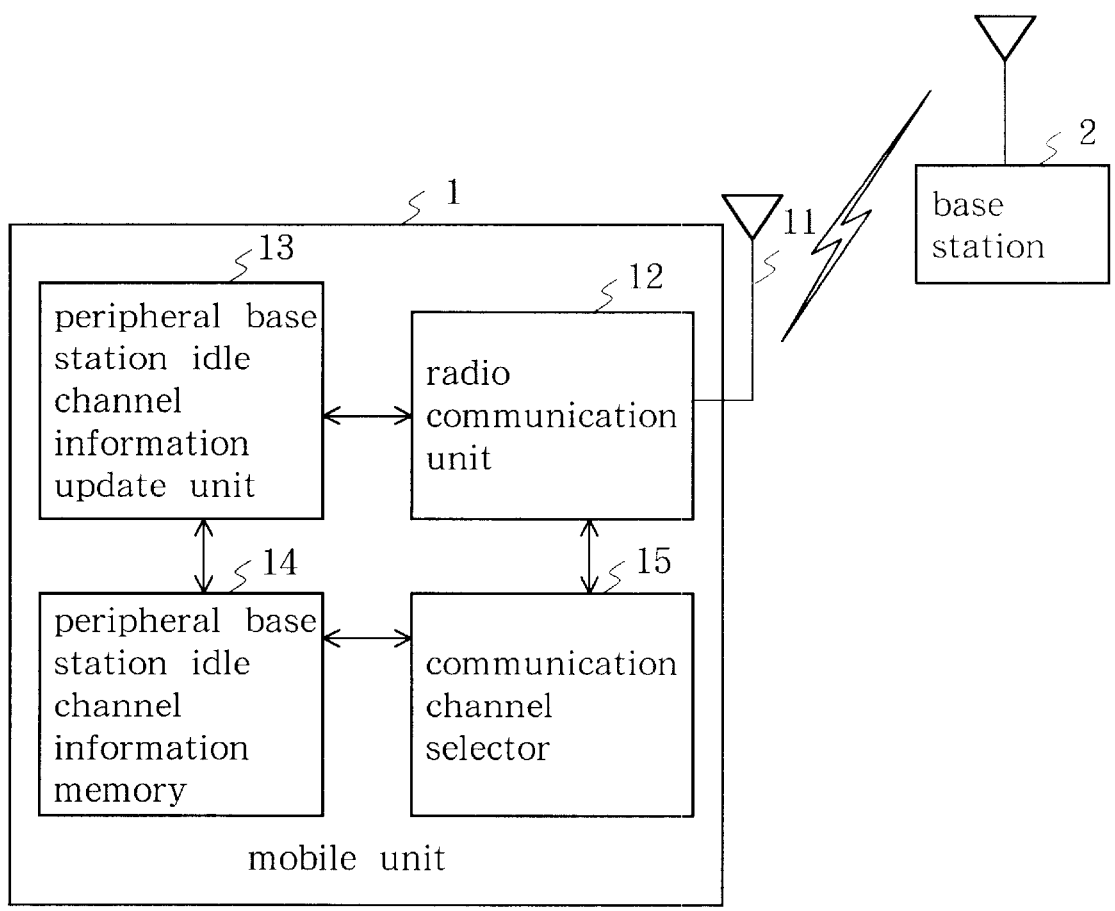
FIG. 3 shows a construction of a mobile unit of the mobile radio communication system of the present invention.

FIG. 3 shows a construction of the mobile unit 1 of the present invention. The mobile unit 1 includes an antenna 11 for communication with the base station 2 through an electromagnetic wave having a predetermined frequency, a radio communication unit 12 for processing a RF signal received from the base station, an idle channel information update unit 13 for updating an idle channel information of peripheral base stations, a peripheral base station idle channel information memory 14 for storing an idle channel information of the peripheral base stations and a communication channel selector 15 for selecting an idle channel from the peripheral base station idle channel information stored in the idle channel information memory 14.

Figure 4:
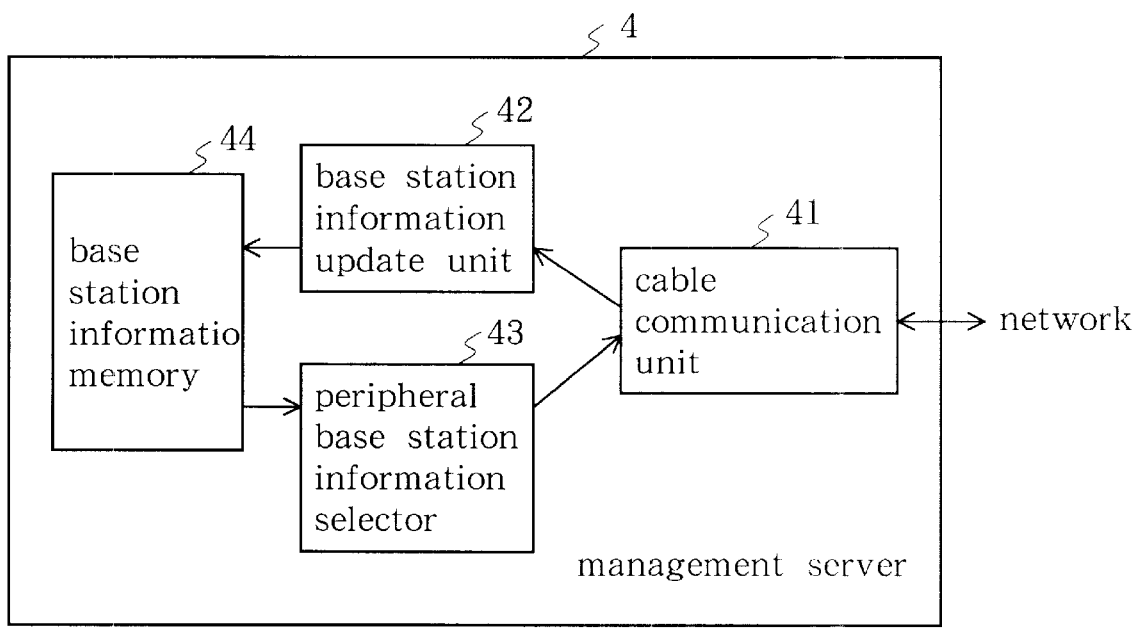
FIG. 4 shows a management server of the mobile radio communication system of the present invention.

FIG. 4 shows a construction of the management server 4 of the present invention. The management server 4 includes a cable network communication unit 41 connected to the base station 2 through the cable network 3, a base station information update device 42 for updating the idle channel information of the respective base stations, a base station information memory 44 for storing an information of a relation between ID's of the respective base stations and idle channels of the respective base stations and an information of a relation between ID's of the respective base stations and ID's of peripheral base stations and a peripheral base station selector 43 for selecting, from the base station information memory 44, an idle channel information of a peripheral base station required by a certain base station.

FIG. 6 shows an example of a memory content of a base station information memory table stored in the base station information memory 44 of the management server 4. The base station information memory 44 stores a first table containing an information of the relation between ID's of the respective base stations and idle channels thereof and a second table containing an information of the relation between ID's of the respective base stations and ID's of peripheral base stations of each base station.

The first table in the base station information memory 44 stores current idle channel information of the respective base stations. That is, there are three idle channels (channels 11, 12 and 13) in the base station 2A, two idle channels (channels 21 and 22) in the base station 2B, two idle channels (channels 31 and 32) in the base station 2C, one idle channel (41) in the base station 2D, and so on.

Further, the second table stores the relation of the base station to the peripheral base stations thereof. That is, the base station 2B is a peripheral base station of the base station 2A, the base stations 2A and 2C are peripheral base stations of the base station 2B, the base stations 2B and 2D are peripheral base stations of the base station 2C, the base station 2C is a peripheral base station of the base station 2D, and so on.

FIG. 7 shows a peripheral base station information table of the base station 2B, which is stored in the peripheral base station idle channel information memory 14 of the mobile unit 1 and indicates that there are three idle channels (11, 12, 13) in the base station 2A, which is the peripheral base station of the base station 2B, and two idle channels (31 and 32) in the base station 2C, which is also the peripheral base station of the base station 2B, totally five idle channels, which may be used by the base station 2B, currently.

Now, an operation of the mobile radio communication system of the present invention will be described with reference to a sequence diagram shown in FIG. 5. First, before a communication link is established between the mobile unit 1 and the base station 2B, the mobile unit 1 searches the peripheral base stations for idle channels (step S501). The mobile unit 1 uses a frequency of an idle channel, which is initially detected by the mobile unit 1, as a frequency of the mobile unit 1 itself with which the mobile unit 1 establishes the communication link with the base station 2B (step S502).

When the communication link is established between the mobile unit 1 and the base station 2B, the base station 2B requests the management server 4 to update the idle channel information thereof through the cable network 3 (step S503). Upon this request, the management server 4 updates the idle channel information of the base station 2B (step S504) and transmits the idle channel information of the peripheral base stations of the base station 2B to the mobile unit 1 through the cable network 3 and the base station 2B (step S505). The mobile unit 1 stores the idle channel information of the peripheral base stations, which is transmitted by the management server 4, in the idle channel information table (step S506).

When the mobile unit 1 switches the communication link from the base station 2B to the base station 2C, the mobile unit 1 selects an idle channel from the peripheral base station idle channel information table provided by the management server 4 (step S507). Then, the mobile unit 1 establishes the communication link to the base station 2C by using the selected channel frequency as the frequency of the mobile unit 1 (step S508). When the communication link to the base station 2C is established, the base station 2C requests the management server 4 to update the idle channel information thereof (step S509). In parallel to the step S509, the base station 2B requests the management server 4 to update the idle channel information of the base station 2B since the mobile unit 1 terminates the use of the channel of the base station 2B (step S510).

Upon the update request from the base station 2C, the management server 4 updates the idle channel information of the base station 2C (step S511) and transmits the idle channel information of the peripheral base stations located peripherally of the base station 2C to the mobile unit 1 through the base station 2C (step S512). The mobile unit 1 stores the peripheral base station idle channel information transmitted from the management server 4 in the table of the peripheral base station idle channel information memory 14 (step S513).

For the ID information of base stations existing peripherally of the base station 2B, which is stored in the base station information memory 44 of the management server 4, it may be possible for the management server 4 to store the ID information of the peripheral base stations of the base station 2B preliminarily or collecting information from the peripheral base stations of the base station 2B as to whether or not the management server 4 can receive an electromagnetic wave, which is transmitted by the base station 2B and contains the ID information of the base station 2B, at a specific time through the network 3.

In the step S503 shown in FIG. 5, the update request of the idle channel information from the base station 2B to the management server 4 is performed as described below. That is, when the communication link is established between the mobile unit 1 and the base station 2B, the information notice unit 24 detects the idle channel information of the base station 2B from the idle channel information memory 25, outputs the ID's of the mobile unit 1 and the base station 2B, the detected idle channel data and a control signal of the information update to the cable network communication unit 21 and the cable network communication device 21 transmits these information to the management server 4 through the cable network 3.

Figure 5:
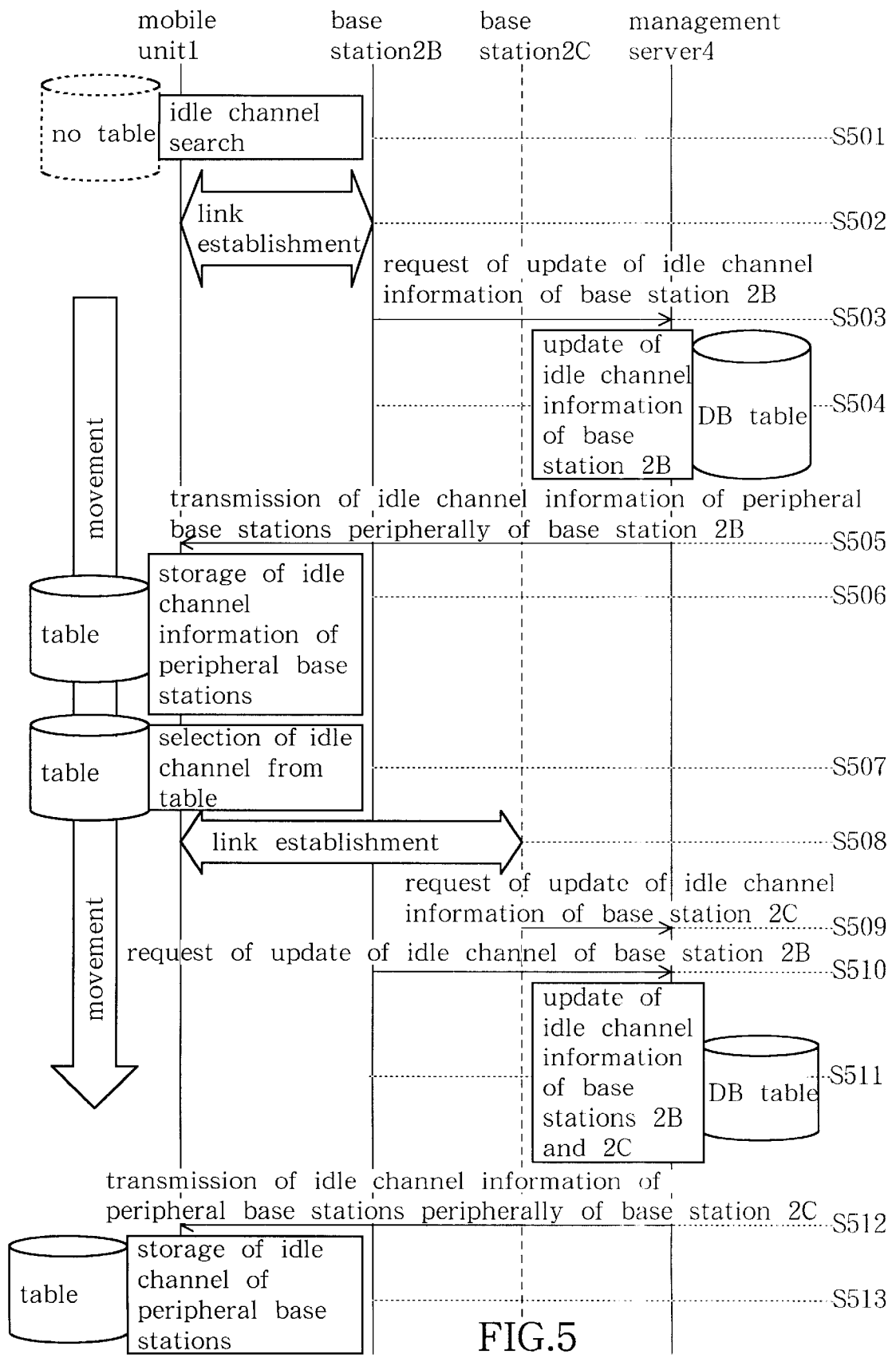
FIG. 5 shows a sequence diagram for explaining an operation of the mobile radio communication system of the present invention.
Figure 8:
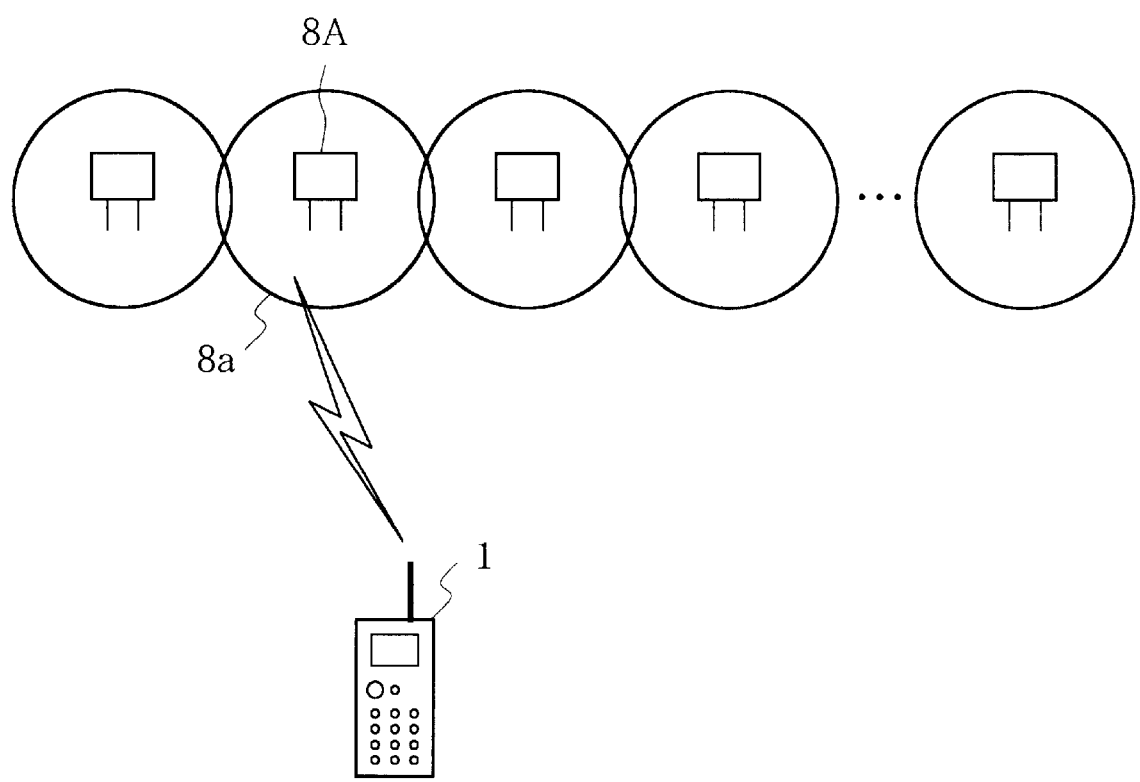
FIG. 8 shows a prior art mobile radio communication system.

In the step S504 shown in FIG. 5, the cable communication unit 41 receives the data and the signal transmitted by the base station 2B through the cable network 3 and outputs them to the base station information update unit 42 and the base station information update unit 42 updates the idle channel of the base station 2B stored in the base station information memory 44.

In the step S505 shown in FIG. 5, the peripheral base station selector 43 of the management server 4 selects the idle channel information of the peripheral base stations located peripherally of the base station 2B from the information table stored in the base station information memory 44 after the idle channel information of the base station 2B is updated. FIG. 7 shows an example of the information detected from the base station information memory 44 by the peripheral base station selector 43. The information selected by the peripheral base station selector 43 is outputted to the cable network communication unit 41 and the cable network communication unit 41 transmits it to the mobile unit 1 through the cable network 3 and the base station 2B.

In the step S506 shown in FIG. 5, the peripheral base station idle channel information of the peripheral base stations located peripherally of the base station 2B, which is transmitted from the management server 4, is received by the antenna 11 of the mobile unit 1 through the cable network 3 and the base station 2B and is outputted to the radio communication unit 12. The radio communication unit 12 transmits the peripheral base station idle channel information to the peripheral base station idle channel information update unit 13 and the peripheral base station idle channel information update unit 13 stores the peripheral base station idle channel information in the peripheral base station idle channel information memory 14.

When the mobile unit 1 moves from the base station 2B to one of the base stations located peripherally of the base station 2B, the communication channel selector 15 selects an idle channel from the idle channel information table, which is stored in the peripheral base station idle channel information memory 14 and is supplied from the management server 4, without searching an idle channel of the peripheral base stations. The mobile unit 1 uses the thus selected idle channel frequency for the one base station as the frequency of the mobile unit 1.

In a case where the channel selected from the idle channel information table provided by the management server 4 by the mobile unit 1 is not a practical idle channel, the mobile unit 1 selects a next idle channel in the idle channel information table. If the secondly selected channel is also not a practical idle channel, the mobile unit 1 selects a third idle channel from the idle channel information table, and so on. In a case where there is no practical idle channel in the peripheral base station idle channel information table, the mobile unit 1 may execute the conventional idle channel search method.

As mentioned, in the radio communication system according to the present invention, which includes a mobile unit capable of performing a communication with respect to a base station while moving from one base station to another, it is enough for the mobile unit in moving from a base station with which a communication link is currently established to another base station to merely select an idle channel from the peripheral base station idle channel information provided by the management server, without searching idle channel of the peripheral base station. Therefore, the time required to search the peripheral base station idle channel by the mobile unit is reduced to thereby improve the search speed.

According to the present invention, the search of the idle channel of the peripheral base stations in the mobile unit is not to detect an idle channel of the peripheral base stations but to select from the peripheral base station idle channel information table provided by the management server. Therefore, the number of searches for detecting an idle channel of the peripheral base stations in the mobile unit can be reduced, so that it is possible to increase the search speed.

What is claimed is:

1. A radio communication system constructed with a service area composed of a plurality of service cells, a base station arranged in each of said cells, a plurality of mobile units and a plurality of channels assigned to each of said base stations, said radio communication system comprising:

a management server connected to each of said base stations through a cable network for managing an idle channel information of each of said base stations and a peripheral base station information of each of said base stations, said management server being adapted to notify one of said mobile units, which is linked with one of said base stations, of the idle channel information of said peripheral base stations of said one base station through said one base station when said management server receives an idle channel update request from said one base station, wherein, when said mobile unit moves from said cell of said one base station to another cell of one of said peripheral base stations thereof, said mobile unit selects an idle channel by referring to the idle channel information stored in a memory of said mobile unit to establish a communication link between said mobile unit and said one of said peripheral base stations by utilizing said selected idle channel, wherein, upon link establishment between said mobile unit and said one base station, said one base station sends a request for an update of idle channel information to said management server, wherein, upon receipt of the request for an update of idle channel information received from said one base station, said management server sends first information corresponding to the update of idle channel information to said one base station and also sends second information corresponding to updated idle channel information for said peripheral base stations of said one base station to said one base station, and wherein said one base station stores said first information in a memory of said one base station, and said one base station forwards said second information to said mobile unit to be stored in the memory of said mobile unit.

2. A radio communication system as claimed in claim 1, wherein said mobile unit does not perform a frequency scan for available channels of said peripheral base station to select said selected idle channel.

3. A management server comprising:

cable network communication means connected to respective base stations through a cable network, base station information update means for updating idle channel information of said respective base stations on the basis of an idle channel information received from said respective base stations through said cable communication means, base station information memory means to store an ID information and an idle channel information of said respective base stations and an ID information of said respective base stations and peripheral base stations of said respective base stations, and peripheral base station selector means for selecting an idle channel information of said peripheral base stations of one of said base stations, which receives an update request from said base station information memory means, and transmitting the selected idle channel information to a mobile unit linked with said one base station, through said cable communication network, wherein the selected idle channel information is stored in a memory of the mobile unit in which the mobile unit refers to the selected idle channel information stored in the memory thereof when determining an idle channel to be used in an on-going communication when the mobile unit moves to one of the peripheral base stations of the one base station, wherein, upon link establishment between said mobile unit and said one base station, said one base station sends a request for an update of idle channel information to said management server, wherein, upon receipt of the request for an update of idle channel information received from said one base station, said management server sends first information corresponding to the update of idle channel information to said one base station and also sends second information corresponding to updated idle channel information for said peripheral base stations of said one base station to said one base station, and wherein said one base station stores said first information in a memory of said base station, and said one base station forwards said second information to said mobile unit to be stored in the memory of said mobile unit.

4. A management server as claimed in claim 3, wherein said mobile unit does not perform a frequency scan for available channels of said peripheral base station to select said selected idle channel.

5. A base station comprising:

a cable network communication means connected to a management server through a cable network, radio communication means connected to a mobile unit through a radio frequency signal, for processing the radio frequency signal between said base station and said mobile unit, information notice means for transmitting an idle channel information of said base station to said management server, and an idle channel information memory means for storing the idle channel information of said base station, wherein idle channel information of peripheral base stations to said base station is sent to said base station from said management server at a same time the idle channel information of said base station is sent to said base station from said management server, wherein the idle channel information of said peripheral base stations is forwarded to said base station to said mobile station and is stored in a memory of said mobile unit, wherein said mobile unit refers to the selected idle channel information stored in the memory thereof when determining an idle channel to be used in an on-going communication when said mobile unit moves to one of said peripheral base stations of said base station, wherein, upon link establishment between said mobile unit and said base station, said base station sends a request for an update of idle channel information to said management server, wherein, upon receipt of the request for an update of idle channel information received from said base station, said management server sends first information corresponding to the update of idle channel information to said base station and also sends second information corresponding to updated idle channel information for said peripheral base stations of said base station to said base station, wherein said base station stores said first information in said idle channel information memory means of said base station, and said base station forwards said second information to said mobile unit to be stored in the memory of said mobile unit.

6. A base station as claimed in claim 5, wherein said mobile unit does not perform a frequency scan for available channels of said peripheral base station to select said selected idle channel.

7. A mobile station comprising:

radio communication means connected to a mobile unit through a radio frequency signal, for processing the radio frequency signal between said base station and said mobile unit, peripheral base station idle channel information update means for updating an idle channel information of peripheral base stations, peripheral base station channel information memory means for storing an idle channel information of said peripheral base stations, and communication channel selector means for selecting an idle channel from the peripheral base station idle channel information stored in said peripheral base station channel information memory means when the mobile unit moves to a cell of one of said peripheral base stations, wherein, upon link establishment between said mobile unit and said base station, said base station sends a request for an update of idle channel information to a management server that is coupled to the base station by way of a cable network, wherein, upon receipt of the request for an update of idle channel information received from said base station, said management server sends first information corresponding to the update of idle channel information to said base station and also sends second information corresponding to updated idle channel information for said peripheral base stations of said base station to one base station, wherein said base station stores said first information in a memory of said one base station, and said base station forwards said second information to said mobile unit to be stored in said peripheral base station channel information memory means of said mobile station.

8. A mobile station as claimed in claim 7, further comprising means for repeating the selecting operation of said communication channel selector means when the channel selected by referring to said idle channel information table of said peripheral base stations given by said management server is a busy channel, in such a way that a next idle channel is selected from the idle channel information.

9. A mobile station as claimed in claim 7, wherein said mobile unit does not perform a frequency scan for available channels of said peripheral base station to select the selected idle channel.

* * * * *